United States Patent

[11] 3,543,778

[72] Inventor Ernest N. Martin
 1141 High St., Escondido, California 92025
[21] Appl. No. 703,073
[22] Filed Feb. 5, 1968
[45] Patented Dec. 1, 1970

[54] IRRIGATION SYSTEM
 9 Claims, 15 Drawing Figs.
[52] U.S. Cl. .................................................. 137/67,
 61/13; 137/119; 251/299
[51] Int. Cl. ...................................................... E02b 13/02,
 F16k 31/44
[50] Field of Search .......................................... 137/67;
 61/12, 13; 239/63

[56] References Cited
UNITED STATES PATENTS

| | | | |
|---|---|---|---|
| 2,768,027 | 10/1956 | Nelson | 137/67 |
| 2,877,784 | 3/1959 | Torgerson | 137/67 |
| 2,991,793 | 7/1961 | Whitlock et al. | 137/67 |
| 3,060,952 | 10/1962 | Bystrom | 137/67 |

Primary Examiner—Robert G. Nilson
Attorney—Warren H. F. Schmieding

ABSTRACT: An irrigation system in which water is delivered from a source of water supply to an area, such as a field, the system comprising a valve for controlling the flow, which valve is closed automatically when the water reaches a predetermined portion of the field, the controlling of the valve closing being in the form of a water soluble element, such as a block of sugar, which, in cooperation with a trigger, maintains the valve open while the block of sugar is in a solid state, but which permits the trigger, through mechanism, to close the valve when the block of sugar disintegrates from its solid state.

Patented Dec. 1, 1970 3,543,778
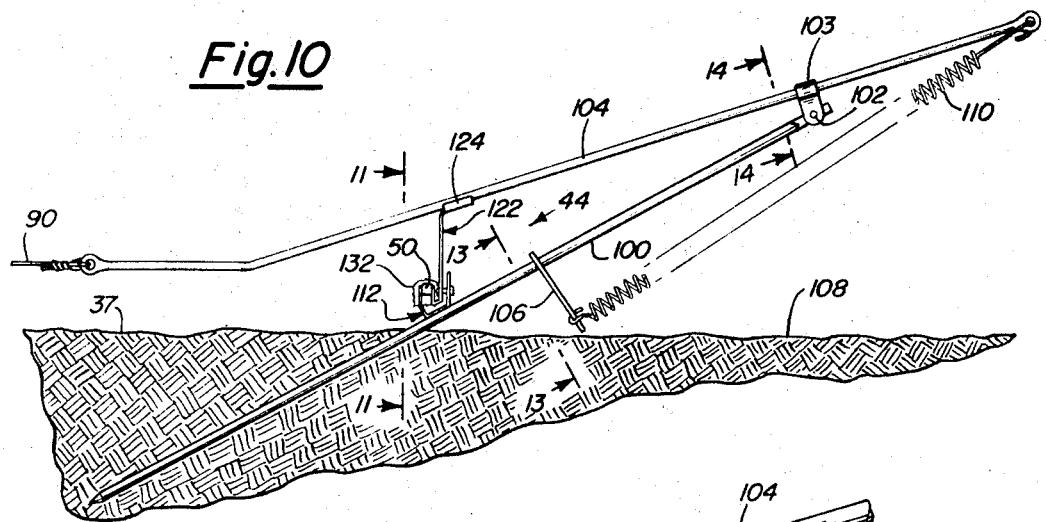
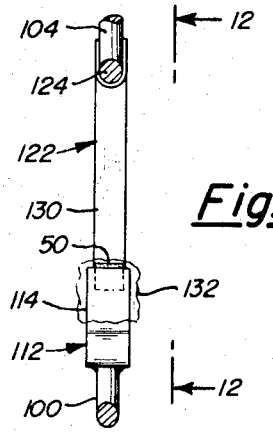
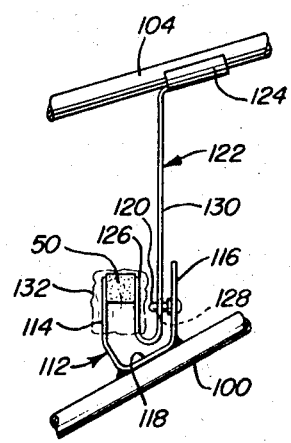
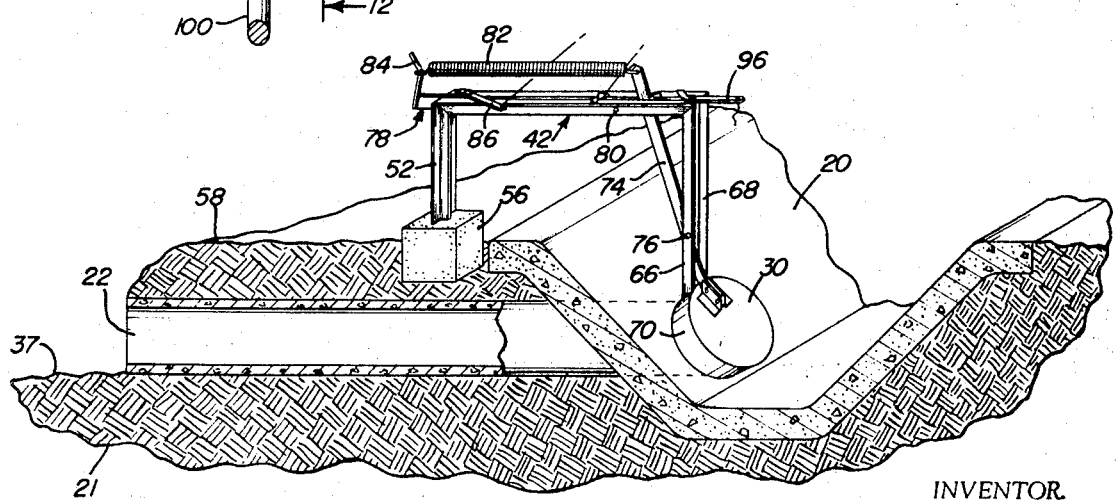
INVENTOR.
ERNEST N. MARTIN
BY
ATTORNEY Patented Dec. 1, 1970
3,543,778
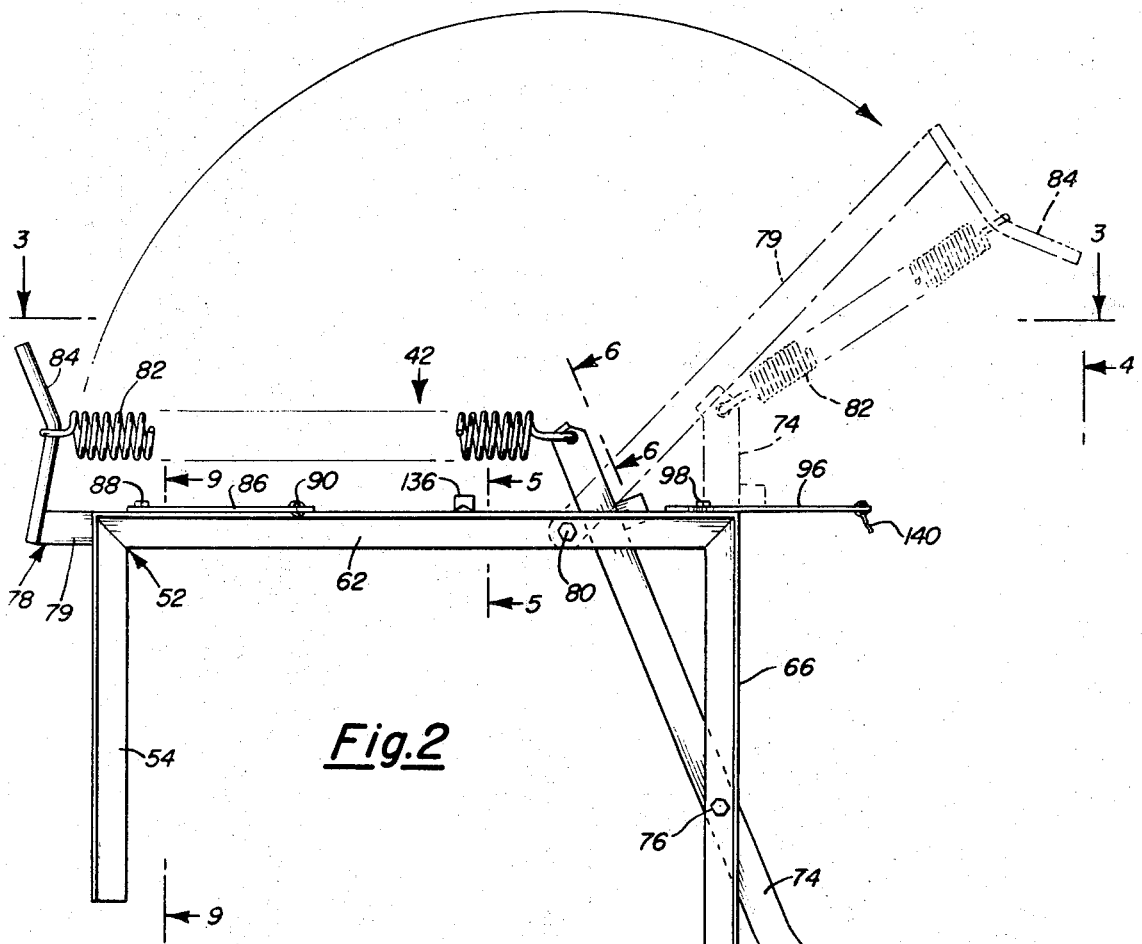
Fig.2
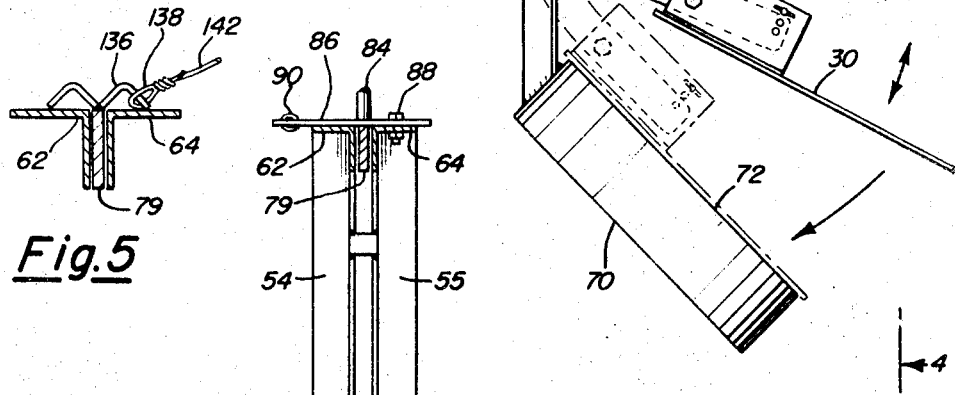
Fig.5 Fig.9
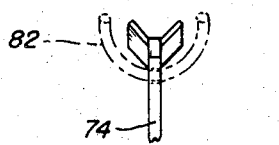
Fig.6
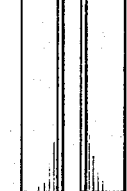
INVENTOR.
ERNEST N. MARTIN
BY
*Warren H. F. Schmieding*
ATTORNEY Patented Dec. 1, 1970
3,543,778
Sheet 3 of 4
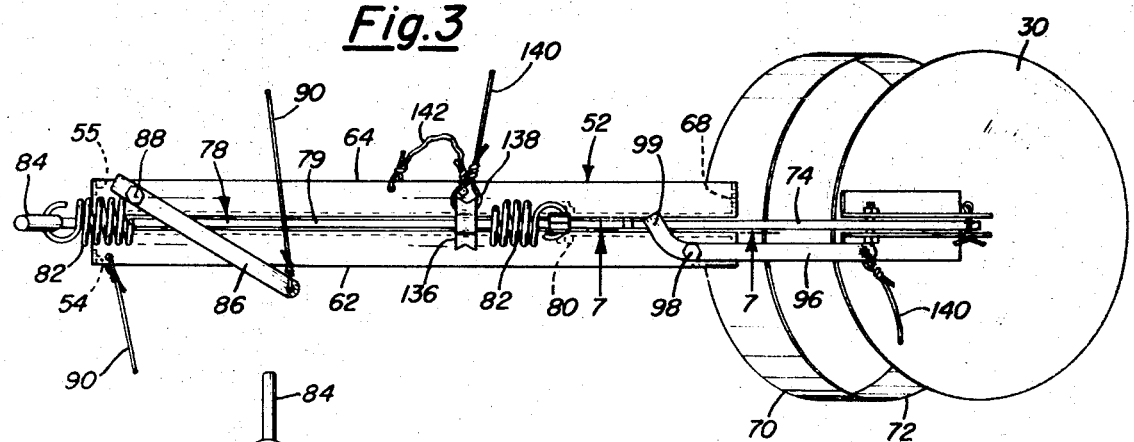
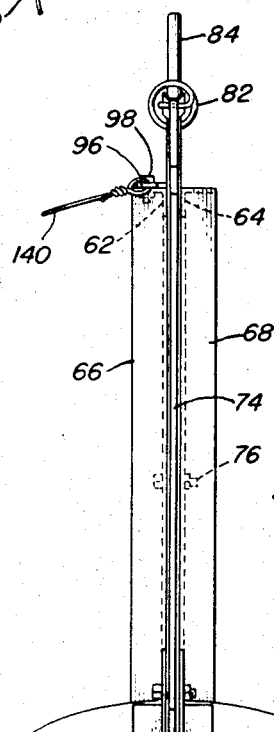
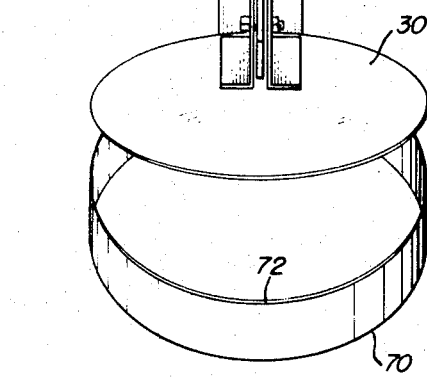
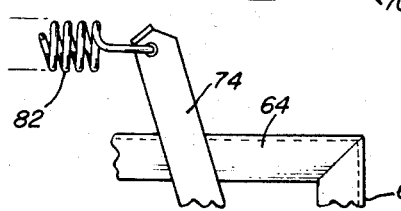
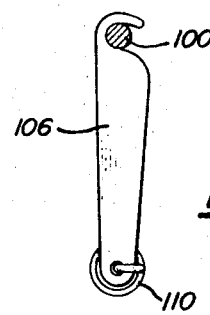
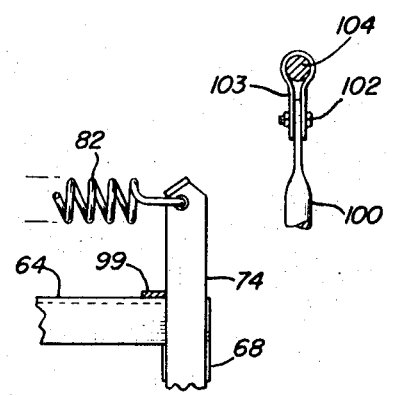
INVENTOR.
ERNEST N. MARTIN
BY
Warren H. F. Schmieding
ATTORNEY

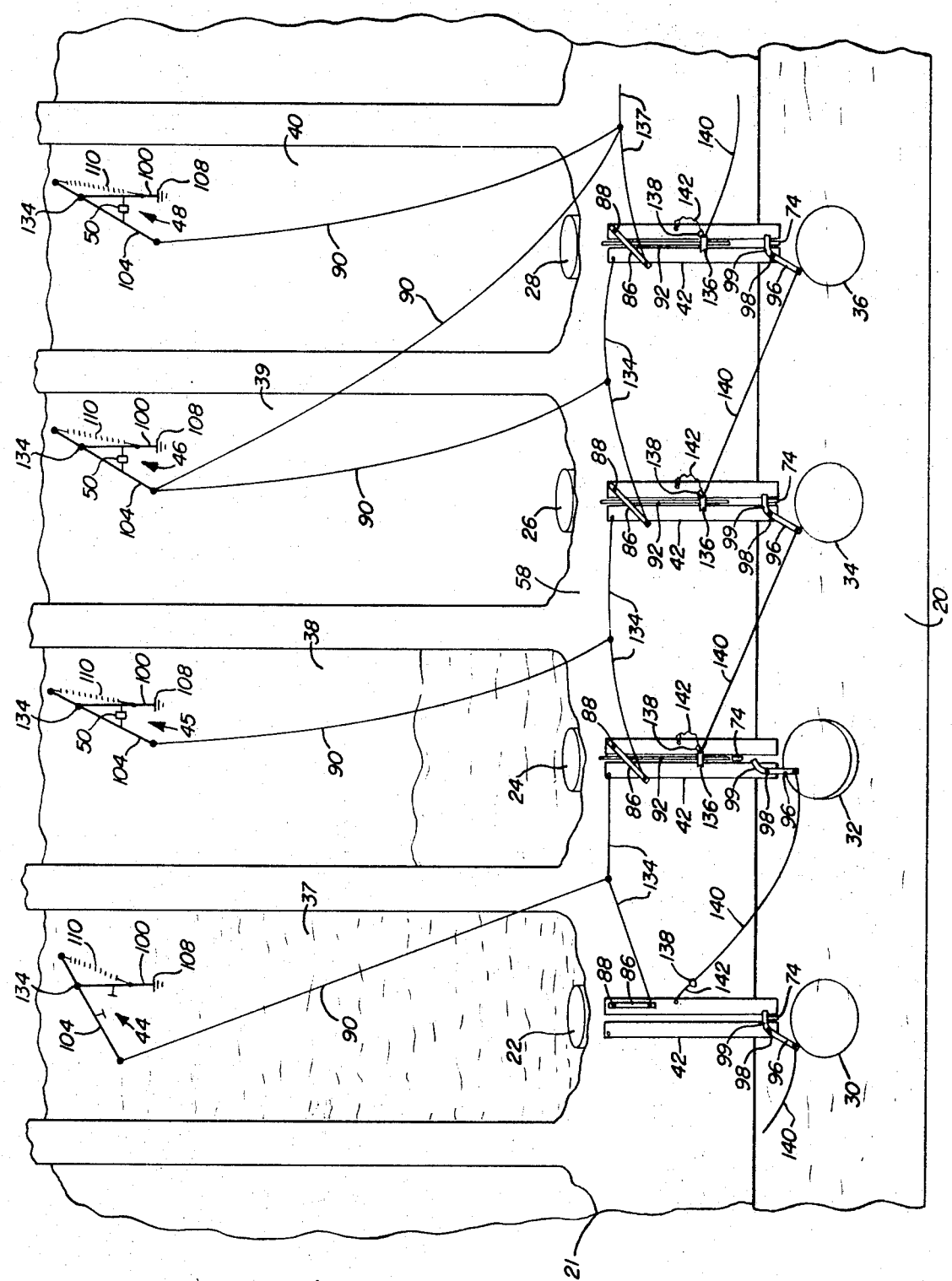

IRRIGATION SYSTEM

BACKGROUND OF THE INVENTION

1. Field of the Invention

The present invention is directed to an irrigation system of the type in which a plurality of valves control the flow of water from a trench to different areas in a field, the valves being opened sequentially or opened in multiple and being closed sequentially or opened in multiple and being closed sequentially or closed in multiple. For example, one valve is open while the others are closed, and when water enters a predetermined area being fed by that valve, that valve is closed automatically and another valve, which latter supplies water to a different area, is opened. Or, when one valve is closed automatically after satisfying a certain area, the mechanism which functioned to close that valve, opens two formerly closed valves, which two valves supply water to other areas.

2. Description of the Prior Art

The prior art known to applicant deals with complicated electrical mechanism. Some of the patented art employs electronic mechanism including probes, such as that disclosed in the Hasenkamp U.S. Pat. No. 2,812,976 issued Nov. 12, 1957, and in the Winters U.S. Pat. No. 3,114,243 issued Dec. 17, 1963. Other patents are directed to systems employing clocks for opening and closing valves, such as the following U.S. Pats: Richards, No. 2,674,490 issued Apr. 6, 1954; Hunter et al., No. 2,821,434, issued Jan. 28, 1958 Seele, No. 3,024,372, issued Mar. 6, 1962; Kinigsberg et al., No. 3,037,704, issued June 5, 1962.

The electrically controlled systems must be maintained operative by experts who are skilled in the art. The time-controlled systems are insensitive to various changes in the environment, such as temperature changes, heat of the sun, rain or the absence of rain. Also, they must be serviced by persons skilled in the electrical art.

Applicant's system is simple in construction, simple to operate, and therefore can be operated and maintained operative by unskilled employees, yet it is sensitive to all environmental changes.

SUMMARY OF THE INVENTION

In practicing the present invention, water is led from a source of water supply to a plurality of land areas in a field, each area being controlled by a valve. For example, all valves except one will be closed, and when the water reaches a predetermined, selected space in the area supplied through the open valve, that valve is then closed and one of the other vaLves is opened or a plurality of valves may be opened. The sensing means which causes the automatic operation of the valves has a characteristic, when in a dry state, which is different from its characteristic when in a wetted state. This sensing means is associated to control a trigger which, when uncocked, causes mechanical mechanism to control the valve. This sensing means is of the water soluble type such as a block of sugar.

Other features and the advantages of the present invention will be apparent from the following description, reference being had to the accompanying drawings wherein a preferred embodiment of the invention is illustrated.

BRIEF DESCRIPTION OF THE DRAWINGS

FIG. 1 is a perspective view showing a water trench, the trench being shown in transverse section, said view also showing one of the pipes leading therefrom, and also showing a valve for controlling the inlet to the pipe and showing the valve actuating mechanism;

FIG. 2 is a side view of the valve and the mechanical assembly for actuating the same, the valve and mechanism being shown in full lines in valve open position, and in dotted lines in valve closed position;

FIG. 3 is a top plan view of the valve and the valve actuating mechanism;

FIG. 4 is an end view looking in the direction of arrow 4 in FIG. 2;

FIGS. 5 and 6 are fragmentary views looking in the direction of arrows 5–5 and 6–6, respectively, in FIG. 2;

FIG. 7 is a fragmentary view looking in the direction of arrows 7–7 of FIG. 3;

FIG. 8 is a view similar to FIG. 7, but showing one of the two latching levers in valve closing position;

FIG. 9 is a fragmentary view, partly in section, the section being taken along line 9–9 of FIG. 2;

FIG. 10 is a side view of one of the trigger mechanisms which functions to actuate the valve actuating mechanism, the trigger mechanism being shown in its installed and cocked position, the ground being shown in section;

FIG. 11 is a fragmentary sectional view taken along line 11–11 of FIG. 10, but on a larger scale;

FIG. 12 is a fragmentary view looking in the direction of arrow 12 of FIG. 11;

FIGS. 13 and 14 are fragmentary sectional views taken along line 13–13 and 14–14, respectively, of FIG. 10, but on a larger scale; and FIG. 15 is a schematic view of the system showing one of the valves in open position and three of the valves in closed position.

DESCRIPTION OF THE PREFERRED EMBODIMENT

Referring in general to the drawings, the trench or ditch 20, containing water, forms the source of water supply and feeds various areas of land 21 through a series of pipes, one of which is shown at 22 in FIGS. 1 and 15 and three more of which are shown at 24, 26 and 28 in FIG. 15. The flow of water in each pipe is controlled independently by like valves 30, 32, 34 and 36, respectively. The valve 30 is shown closed in FIG. 1; the valve 32 is shown open in FIG. 15; and the valves 34 and 36 are shown closed in FIG. 15.

The areas to be watered through the valves 30, 32, 34 and 36 are shown, respectively, as furrows 37, 38, 39 and 40. As diagrammatically shown in FIG. 15, the furrow 37 has been flooded; the furrow 38 is being flooded; and the furrows 39 and 40 are about to be flooded sequentially. Therefore, valves 30, 34 and 36 are shown closed, while valve 32 is shown open.

The valve actuating mechanisms 42 are each independently controlled by like triggers 44, 45, 46 and 48, respectively. The trigger mechanism is held in cocked position by a means having the characteristic when in a dry state which is different from its characteristic when it is in a wetted state. Preferably this means is an element which is soluble in water and is herein shown, for example, as a block of sugar 50. This trigger mechanism is disposed at a predetermined area which is to be flooded and is maintained cocked until the water saturates the block of sugar, at which time the trigger mechanism will actuate that valve which will stop the flow of water to the particular furrow and at the same time it will actuate to open the valve which is next to receive water. For example, the trigger mechanism 44 in furrow 37 has been actuated and closed the valve 30 and opened the valve 32 for furrow 38. As soon as the water disintegrates the block of sugar in trigger 45 in furrow 38, valve 32 will be closed and valve 34 for furrow 39 will be opened.

At the start of the sequence, all valves are closed and preferably this closing is done manually. To start the sequence in the example given, the valve 30 for furrow 37 is opened manually and thereafter all closings and openings of the valves are carried out sequentially automatically. While we have shown only four furrows, it is to be understood that many others are usually fed.

Referring more in detail to the drawings, the mechanism 42 for actuating the valves includes a frame 52 including a pair of rear uprights 54 and 55 which are embedded in a block of concrete 56 (see FIG. 1), the latter being embedded in the ridge 58 which separates the trench 20 from the field 21. These uprights 54 and 55 are formed of angle irons and are fastened to one another in any suitable manner. The uprights 54 and 55 carry a pair of horizontally disposed angle irons 62 and 64 which are spaced from one another as is more clearly shown in FIGS. 3 and 9. The angle irons 62 and 64 extend forwardly and at their front end carry downwardly extending angle irons 66 and 68. The lower ends of the angle irons 66 and 68 carry pipe fittings 70. These pipe fittings lead to the pipes 22, 24, 26 and 28. As shown in FIG. 2, the right edge 72 of the pipe fitting 70 forms a valve seat for the valve 30. The valve 30 is carried by a lever 74 which is pivotally mounted on the angle irons 66 and 68 by a pivot pin 76.

A carriage 78 includes a bar 79 in the form of a lever which extends between angle irons 62 and 64 and is pivotally mounted on a pivot pin 80 carried by the angle irons 62 and 64. One end of a spring 82 is anchored to an arm 84 (see FIG. 2) at the left end of the carriage bar 79 and right end of the spring is connected with the upper end of the valve actuating lever 74. When the carriage is in the position in full lines in FIG. 2, the valve 30 is held in the open position. The carriage is held in the position shown in FIG. 2 by a latch arm 86 which is pivotally mounted on a pivot pin 88 on angle iron 64 and extends across the carriage bar 79 as is shown in FIGS. 3 and 9.

Referring now to FIG. 3, the latch arm 86 is moved to unlatched position by a wire or cable 90 which is adapted to impart counterclockwise movement to the arm. As viewed in FIG. 2, the carriage 78 is biased toward a clockwise direction by the spring 82, and when it is unlatched, this spring moves the carriage from the full line position shown in FIG. 2 to the dotted line position shown in that FIG. The distance between the upper end of the valve carrying lever 74 and the arm 84 on the carriage bar 79 is such that the spring 82 is still under tension and moves, and thereafter maintains the valve 30 upon its seat 72.

The latching arm or lever 86 is moved to the unlatching position through the cable 90 after the sugar block dissolves in that furrow which is being fed by the valve 30.

As previously set forth, usually all of the valves are closed by any suitable means and are preferably closed manually. The valves are latched in closed position by a latch arm in the form of a lever 96 (see FIGS. 2 and 3) which is pivotally mounted on pin 98 on angle iron 62. The left end 99 of lever 96, as viewed in FIG. 3, is adapted to be hooked in back of the upper end of valve carrying lever 74, as shown in FIG. 8, by turning the lever clockwise from the position shown in FIG. 7. After being closed, the valve actuating mechanism 42 is moved manually from the dotted line position shown in FIG. 2 to the full line position shown in that FIG. Thereafter the latch arm 86 is moved to the position shown in FIGS. 3 and 9. When it is desirable to start the sequence of watering, the lever 96 is moved manually from the position shown in FIG. 8 to the position shown in FIGS. 7 and 3. The spring 82 will then rotate valve lever 74 counterclockwise to the position shown in FIG. 3, to open valve 30 as shown in full lines.

Referring now to FIGS. 10 through 14, inclusive, the trigger 44 includes a spike which is driven in the ground at an angle as shown in FIG. 10. The upper end of this spike carries a pivot pin 102 which connects a clamp 103 with rod 104. The spike carries a clevis 106 intermediate the right end of the spike and the ground level 108. The rod 104 extends in the general direction of the spike 100 and the upper end of a spring 110 is connected to the right end of the rod 104 and the lower end of the spring is connected to the clevis 106. The spring 110 is under tension and its tension can be adjusted by sliding the clevis along the spike 100, it being held in position due to its angular relationship with the spike 100. The spring 110, being under tension, tends to pull the rod 104 in a clockwise direction, but is prevented from doing so by the sensing element 50.

Referring to FIG. 12, it will be seen that the top of the spike 100 carries a U-shaped bracket 112 having a left leg 114, a right leg 116 and a yoke 118 which later is welded to the spike 100. The right leg 116 carries a guide pin 120. A bracket 122 has one end 124 fixed to the under side of rod 104 and is provided at its lower end with a reverse bend portion 126 which lies parallel with the leg 114 of the bracket 112. The bracket 122 is provided with an opening 128 which receives the guide pin 120. The bracket 122 is formed of resilient and flexible material and the reverse bend portion 126 is biased toward the left as viewed in FIG. 12 so as to resiliently hold the block of sugar 50 between it and the left leg 114 of bracket 112. In setting the block of sugar, the upright leg 130 of the bracket 122 is moved to the left and as the rod 104 is forced downwardly, and when the opening 128 registers with the pin 120, the bracket 122 is latched to the bracket 122. Thereafter, either the flexible leg 114 or the flexible reverse bend 126 is spread apart to receive the block of sugar. Once in position, the block of sugar is retained frictionally in position. The block of sugar and the upper ends of the leg portion 114 and reverse bend 126 are covered by an open-bottom shroud 132 so that the sugar is subjected only to water flowing through the bottom of the shroud.

Usually the spike 100 is positioned at a predetermined place intermediate the ends of a furrow and the sugar is dissolved soon after the mass of water reaches it, and the excess water flowing is sufficient to provide ample water throughout the entire length of the furrow. The trigger 44 closes the valve 30 when sufficient water has entered the furrow 36. When the trigger is uncocked, the rod 104 is moved in a clockwise direction about pin 102, it being jerked by the spring 110 causing the rod to pivot about the pin 102 at the upper end of the spike 100. This movement jerks the cable 90 to the right as viewed in FIG. 10, and rearwardly as shown in FIG. 3, whereby the latch arm 86 is removed from its carriage retaining position, i.e., from the position shown in full lines in FIG. 2 to the dotted lines shown in that FIG., resulting in the closing of the valve 30 onto the valve seat 72. In the preferred embodiment, the cable 90 is connected to the latch arm 86 through a harness including a cable 137 which is connected to the arm 86 and the frame of the next adjacent valve mechanism, as shown diagrammatically in FIG. 15.

Simultaneously, the aforementioned movement of the carriage effects the opening of valve 32. As more clearly shown in FIG. 5, the bar 79 of the carriage 78 has an M-shaped clip 136 welded thereon which receives the loop 138 of a cable 142. One of the legs of the M-shaped clip bears upon the top of angle iron 64 for retaining this loop in position. Upon upward and clockwise movement of the carriage 78, the loop 138 and cable 142 are actuated to move the latch arm 96 of the valve actuating mechanism for valve 32 in a clockwise direction, i.e., from the dotted lines position shown in FIG. 2 to the full lines position shown in that FIG. The spring 82 then moves the valve 32 to a corresponding position as shown by the full lines for lever 74 and valve 30 of FIG. 2. After the cable 140 has been actuated by the snap action of the carriage 78, the loop 138 is released from the clip 136, but is prevented from escaping or moving too far by a cable or wire 142 which is connected to the loop 138 and to the angle iron 62.

Referring specifically to FIG. 15, it will be seen that the furrow 37 has been satisfied, the trigger 44 was uncocked and the valve 30 was closed. When the valve 30 was closed, the valve 32 was opened to supply water to the furrow 38. This sequence is carried out until all furrows have been satisfied with water.

While we have shown schematically the closing of one valve and the opening of another, it is to be understood that the harness could be so arranged that the valve 34 could also be opened simultaneously with the valve 32. Likewise, two valves can be closed simultaneously while a single valve or multiple valves are opened.

From the foregoing, it is readily apparent that by virtue of the present invention, unskilled labor can be employed for operating the system. It will be understood that all valves will have been closed at the termination of the previous wetting operation after once determining where the sensing block of sugar should be placed and then placing the spikes at those places. The attendant simply shifts the carriages from the dotted line position shown in FIG. 2 to the full line position and while doing so, he will hook the loop 138 of the cable 140 with the clip 136. This latter movement causes the latch arm 96 to be moved in a clockwise direction, as viewed in FIG. 3, i.e., to the position shown in FIG. 8 to thereby latch the valve closed. The cable 140 is then taut as shown in FIG. 15 between the valve actuating mechanisms for valve 32 and valve 34 and between valve mechanism for valve 34 and valve 36. When the cable loop 138 of cable 140 is released, upon upward movement of bar 79 if carriage 78, the spring 88 will pull the upper end of valve lever 74 counterclockwise, as viewed in FIG. 3, and to the left as viewed in FIG. 3, to open the valve and will move the latch lever 96 from the closed to the open position, i.e., from the position shown in FIG. 8. This can be accomplished since the cable 140 is no longer taut, as is shown in FIG. 15, between the valve actuating mechanism for valve 30 and the valve actuating mechanism for valve 32. He then latches the carriage through the latch arm 86 in the position shown in full lines in FIG. 2 and moves the latch arm 96 from the full line position shown in FIG. 3 to the dotted line position shown in that FIG. All valves are thereby closed by their respective latch arms 86 and 96.

To start the cycle, it is necessary only to move the latch arm 96 of the valve actuating mechanism for valve 30 from the dotted lines position to the full lines position shown in FIG. 2.

While the form of embodiment herein shown and described constitutes preferred form, it is to be understood that other forms may be adopted.

I claim:

1. An irrigation system of the type in which water is delivered from a source of water supply to an area, such as a field, which system comprises:
   A. a valve for controlling the flow of water from the source of supply to the area;
   B. mechanism for moving the valve from its open position to its closed position, said mechanism including:
      1. valve closing means, including:
         a. power means for moving the valve closing means;
      2. a releasible trigger for controlling the power means, which trigger when cocked prevents the power means from actuating the valve closing means, said power means being freed to actuate the valve closing means when the trigger is moved from the cocked position;
      3. and means having a characteristic when in a dry state which is different from its characteristic when in a wetted state, said last mentioned means being associated with the trigger for maintaining the trigger cocked while in a dry state, said trigger being moved from the cocked position upon wetting of the last mentioned means;
   C. a second valve for controlling the flow of water from the source of supply to another area;
   D. mechanism for closing the second mentioned valve; and
   E. mechanism connecting the first mentioned mechanism with the second mentioned mechanism for opening the second mentioned valve when the power means is free to function to close the first mentioned valve.

2. An irrigation system as defined in claim 1, characterized to include:
   F. mechanism for moving the second valve from its open position to its closed position, said mechanism including:
      1. valve closing means including:
         a. power means for moving the valve closing means;
      2. a releasible trigger for moving the second mentioned power means, which latter trigger when cocked prevents the latter power means from actuating the second mentioned valve closing means, said latter power means being freed to actuate the second mentioned valve closing means when the latter trigger is moved from its cocked position; and
      3. means having the characteristic when in a dry state which is different from its characteristic when in a wetted state, said last mentioned means being associated with the second mentioned trigger for maintaining the second mentioned trigger cocked when in a dry state, said second mentioned trigger being moved from the cocked position upon wetting of the last mentioned means.

3. An irrigation system as defined in claim 2, characterized to include:
   G. means for latching the second mentioned valve in closed position;
   H. fastening means connecting the last mentioned latching means and the first mentioned mechanism for retaining the last mentioned latching means in latching position; and
   I. means controlled by the first mentioned mechanism for rendering the fastening means ineffective.

4. An irrigation system as defined in claim 3, characterized to include:
   J. a frame;
   K. means for movably supporting the first mentioned valve on the frame; and further characterized in that the first mentioned mechanism (B) includes:
      4. a carriage;
      5. means for supporting the carriage on the frame, said carriage being movable from one position to another position, said power means connecting the carriage and the valve; and
      6. means for latching said carriage against movement when in said one position, said power means biasing the valve to open position when the carriage is latched in said one position, and biasing the carriage to the other position to close the valve when the latching means is rendered ineffective; and further characterized in that the trigger renders the latching means ineffective when the trigger is moved from the cocked position; and further characterized to include:
   L. means for latching the second mentioned valve in closed position;
   M. fastening means connecting the last mentioned latching means and the carriage for retaining the last mentioned latching means in latching position; and
   N. means controlled by the carriage for rendering the fastening means ineffective.

5. An irrigation system as defined in claim 1, characterized to include;
   F. a frame;
   G. means for movably supporting the first mentioned valve on the frame; and further characterized in that the power means (B) (1) (a) is a spring; and further characterized in that the mechanism (B) includes:
      4. a carriage;
      5. means for supporting the carriage on the frame, said carriage being movable from one position to another position, said spring connecting the carriage and the valve;
      6. means for latching said carriage against movement when in said one position, said spring biasing the valve to open position when the carriage is latched in said one position, and biasing the carriage to the other position to close the first mentioned valve when the latching means is rendered ineffective;
   and further characterized in that the third mentioned mechanism (E) includes:
      1. a member connecting the carriage with the second mentioned valve, said member being movable with the carriage to open the second mentioned valve when the carriage moves from the first mentioned position to the second mentioned position.

6. An irrigation system of the type in which water is delivered from a source of water supply to an area, such as a field, which system comprises:
   A. a valve for controlling the flow of water from the source of supply to the area;
   B. a frame;

C. mechanism for moving the valve from its open position to its closed position, said mechanism including:
  1. Valve closing means including;
    a. power means for moving the valve closing means,
  2. a carriage;
  3. means for supporting the carriage on the frame, said carriage being movable from one position to another position, said power means connecting the carriage and the valve;
  4. means for latching said carriage against movement when in said one position; said power means biasing the valve to open position when the carriage is latched in said one position, and biasing the carriage to the other position to close the valve when the latching means is rendered ineffective;
  5. a releasable trigger adapted to be cocked, said trigger being connected with the latching means ineffective when moved from the cocked position;
  6. means having the characteristic when in a dry state which is different from its characteristic when in a wetted state, said last mentioned means being associated with the trigger for maintaining the trigger cocked while in a dry state, said trigger being moved from the cocked position upon wetting of the last mentioned means.

7. An irrigation system as defined in claim 6 characterized in that the carriage is a lever, and further characterized in that the means for pivotally supporting the lever on the frame is a pivot.

8. An irrigation system as defined in claim 6, characterized in that the means (D) for movably supporting the valve on the frame includes:
  D. 1. a lever,
    2. a pivot for supporting the lever on the frame.

9. An irrigation system of the type in which water is delivered from a source of water supply to an area, such as a field, which system comprises:
A. a valve for controlling the flow of water from the source of supply to the area;
B. mechanism for moving the valve from its open position to its closed position, said mechanism including:
  1. valve closing means, including:
    a. power means for moving the valve closing means,
  2. A releasable trigger for controlling the power means, which trigger when cocked prevents the power means from actuating the valve closing means, said power means being freed to actuate the vaLve closing means when the trigger is moved from the cocked position,
  3. and means having a characteristic when in a dry state which is different from its characteristic when in a wetted state, said last mentioned means being associated with the trigger for maintaining the trigger cocked while in a dry state, said trigger being moved from the cocked position upon wetting of the last mentioned means;
C. means for fastening the trigger and said means (B)(3) at selected places in said area;
D. a frame;
E. means for movably supporting the valve on the frame;
F. a carriage;
G. means for supporting the carriage on the frame, said carriage being movable from one position to another position on the frame;
H. means for latching said carriage against movement when in said one position, said power means biasing the valve to open position when the carriage is latched in said one position, and biasing the carriage to the other position to close the valve when the latching means is rendered ineffective;
I. a second power means connected with the trigger and rendered effective when the trigger is moved from its cocked position, said second power means being connected with said valve closing means (B)(1) and with the latch means for rendering the latching means ineffective when the trigger is moved from its cocked position.

UNITED STATES PATENT OFFICE
CERTIFICATE OF CORRECTION

Patent No. 3,543,778           Dated December 1, 1970

Inventor(s) Ernest N. Martin

It is certified that error appears in the above-identified patent and that said Letters Patent are hereby corrected as shown below:

Column 1, line 10, cancel "opened in multiple and being closed sequentially or". Column 5, line 10, "if" should read -- of --. Column 7, line 17, after "means" insert -- for rendering the latching means --.

Signed and sealed this 9th day of March 1971.

(SEAL)
Attest:

EDWARD M.FLETCHER,JR.          WILLIEM E. SCHUYLER, J
Attesting Officer               Commissioner of Patent